(12) United States Patent
Von Blücher (10) Patent No.: US 11,578,950 B2
(45) Date of Patent: Feb. 14, 2023

(54) BALLISTIC PROTECTION MATERIAL AND USE THEREOF

(71) Applicant: Blücher GmbH, Erkrath (DE)

(72) Inventor: Hasso Von Blücher, Erkrath (DE)

(73) Assignee: Blucher GmbH (DE)

( * ) Notice: Subject to any disclaimer, the term of this patent is extended or adjusted under 35 U.S.C. 154(b) by 54 days.

(21) Appl. No.: 15/999,322

(22) PCT Filed: Feb. 15, 2017

(86) PCT No.: PCT/EP2017/053355
§ 371 (c)(1),
(2) Date: Aug. 17, 2018

(87) PCT Pub. No.: WO2017/140707
PCT Pub. Date: Aug. 24, 2017

(65) Prior Publication Data
US 2019/0049222 A1 Feb. 14, 2019

(30) Foreign Application Priority Data

Feb. 17, 2016 (DE) ..................... 10 2016 001 799.6
Jun. 14, 2016 (DE) ..................... 10 2016 110 896.0

(51) Int. Cl.
*F41H 5/04* (2006.01)
*B32B 7/12* (2006.01)
(Continued)

(52) U.S. Cl.
CPC ......... *F41H 5/0492* (2013.01); *F41H 5/0471* (2013.01); *B32B 7/12* (2013.01); *B32B 9/047* (2013.01); *B32B 17/02* (2013.01); *B32B 2250/05* (2013.01); *B32B 2305/18* (2013.01); *B32B 2305/28* (2013.01); *B32B 2305/80* (2013.01); *B32B 2307/3065* (2013.01); *B32B 2307/558* (2013.01); *B32B 2307/724* (2013.01); *B32B 2323/043* (2013.01); *B32B 2571/02* (2013.01)

(58) Field of Classification Search
CPC .. F41H 5/0471; F41H 5/0492; F41H 1/00–04; B32B 7/12
USPC ........................................................ 89/36.02
See application file for complete search history.

(56) References Cited

U.S. PATENT DOCUMENTS 3,705,558 A * 12/1972 McDougal ............ F41H 5/0421
109/84
5,134,725 A * 8/1992 Yeshurun .............. F41H 5/0435
2/102
(Continued)

FOREIGN PATENT DOCUMENTS

DE 3938741 3/1991
DE 102010035639 A1 * 4/2011 ............. B65H 51/06
(Continued)

*Primary Examiner* — Joshua E Freeman
*Assistant Examiner* — Benjamin S Gomberg
(74) *Attorney, Agent, or Firm* — Edward E. Sowers; Brannon Sowers & Cracraft PC (57) ABSTRACT

The present invention relates to a protective material, preferably a ballistic protection material, having a protective function against ballistic active bodies (launch bodies), in particular against reinforcement-penetrating and/or armor-piercing projectiles, thrust bodies or penetrating bodies, and to the use thereof.

9 Claims, 3 Drawing Sheets

(51) Int. Cl.
*B32B 9/04* (2006.01)
*B32B 17/02* (2006.01)

(56) References Cited

U.S. PATENT DOCUMENTS

| | | | | |
|---|---|---|---|---|
| 5,763,813 | A * | 6/1998 | Cohen | F41H 5/0414 |
| | | | | 109/84 |
| 5,866,839 | A | 2/1999 | Ohayon | |
| 8,096,223 | B1 * | 1/2012 | Andrews | F41H 5/0492 |
| | | | | 89/36.02 |
| 8,220,378 | B2 * | 7/2012 | Gamache | F41H 5/0492 |
| | | | | 89/36.02 |
| 9,347,746 | B1 * | 5/2016 | Andrews | F41H 7/00 |
| 2009/0090236 | A1 * | 4/2009 | Misencik | E04H 9/10 |
| | | | | 89/36.02 |
| 2010/0170386 | A1 * | 7/2010 | Bhatnagar | F41H 5/023 |
| | | | | 89/36.02 |
| 2010/0275765 | A1 | 11/2010 | Lagrotta et al. | |
| 2011/0048220 | A1 * | 3/2011 | Dickson | B32B 5/12 |
| | | | | 89/36.02 |
| 2012/0240758 | A1 * | 9/2012 | Cohen | F41H 5/0414 |
| | | | | 89/36.02 |
| 2012/0312150 | A1 * | 12/2012 | Gamache | F41H 5/0492 |
| | | | | 89/36.02 |
| 2012/0318131 | A1 * | 12/2012 | Forrest | C08L 77/10 |
| | | | | 89/36.02 |
| 2014/0033908 | A1 * | 2/2014 | Grozdanich | F41H 5/02 |
| | | | | 89/36.02 |
| 2015/0253114 | A1 * | 9/2015 | Neal | F41H 5/0421 |
| | | | | 89/36.02 |
| 2015/0377592 | A1 * | 12/2015 | Roland | F41H 5/0457 |
| | | | | 89/36.02 |
| 2016/0185667 | A1 * | 6/2016 | Shikolsky | B02C 17/20 |
| | | | | 501/89 |

FOREIGN PATENT DOCUMENTS

| | | | |
|---|---|---|---|
| EP | 0499812 | 8/1992 | |
| EP | 1828706 | 9/2007 | |
| EP | 2749662 | 7/2014 | |
| GB | 2487966 A * | 8/2012 | F41H 1/02 |
| WO | 2007029237 | 3/2007 | |
| WO | 2016005066 | 1/2016 | |

\* cited by examiner

BALLISTIC PROTECTION MATERIAL AND USE THEREOF

CROSS-REFERENCES TO RELATED APPLICATIONS

This application is a National Stage filing of International Application PCT/EP 2017/053355, filed Feb. 15, 2017, entitled "Ballistic protection material and use thereof", claiming priority to DE 10 2016 001 799.6 filed Feb. 17, 2016, and to DE 10 2016 110 896.0 filed Jun. 14, 2016. The subject application claims priority to PCT/EP 2017/053355, to DE 10 2016 001 799.6, and to DE 10 2016 110 896.0, and incorporates all by reference herein, in their entirety.

BACKGROUND OF THE INVENTION

The present invention relates to the technical field of protective apparel which has been designed particularly for military use, but if appropriate also for civil use, and which specifically has a protective function against ballistic active bodies (projectile bodies), especially reinforcement-penetrating and/or armor-piercing projectiles, shear bodies or penetration bodies.

More particularly, the present invention relates to a protective material, preferably a ballistic protective material with a protective function against ballistic active bodies (projectile bodies), especially against reinforcement-penetrating and/or armor-piercing projectiles, shear bodies or penetration bodies.

The present invention likewise relates to a protection element, preferably ballistic protection element, especially with a protective function against ballistic active bodies (projectile bodies), especially against reinforcement-penetrating and/or armor-piercing projectiles, shear bodies or penetration bodies, preferably in the form of a ballistic protection plate, especially a ballistic armor component, more preferably a ballistic and/or ballistic-resistant composite armor plate.

The present invention further relates to a protective apparel item, preferably a ballistic protective outer apparel item, especially in the form of a ballistic and/or ballistic-resistant protective vest or jacket, preferably with a protective function against ballistic active bodies (projectiles), especially against reinforcement-penetrating and/or armor-piercing projectiles, shear bodies or penetration bodies.

The present invention likewise relates to a protective apparel unit, preferably a ballistic protective apparel unit, preferably with a protective function against ballistic active bodies (projectile bodies), especially against reinforcement-penetrating and/or armor-piercing projectiles, shear bodies or penetration bodies, comprising outer apparel and/or underwear (inner apparel) and optionally comprising separate head and/or face protection, neck protection, shoulder protection, arm protection, hand protection, trunk protection, torso protection, genital and/or anal protection and/or leg protection.

The present invention also further relates to the use of a protective material and/or at least one protection element for manufacture of all kinds of protective apparel, preferably with a protective function against ballistic active bodies (projectile bodies), especially against reinforcement-penetrating and/or armor-piercing projectiles, shear bodies or penetration bodies.

The present invention likewise relates to the use of at least one protective material and/or at least one protection element, preferably a ballistic protection element in plate form, especially ballistic armor component, more preferably a ballistic and/or ballistic-resistant composite armor plate, for endowing apparel with a protective function against ballistic active bodies (projectile bodies), especially against reinforcement-penetrating and/or armor-piercing projectiles, shear bodies or penetration bodies.

The present invention additionally relates to the use of at least one protective material and/or at least one protection element, preferably a ballistic protection element in plate form, especially ballistic armor component, more preferably a ballistic and/or ballistic-resistant composite armor plate, for manufacture of all kinds of vehicles, especially cars, trucks, utility vehicles, land vehicles or the like, preferably with a protective function against ballistic active bodies (projectile bodies), especially against reinforcement-penetrating and/or armor-piercing projectiles, shear bodies or penetration bodies.

The present invention further relates to the use of at least one protective material and/or at least one protection element, preferably a ballistic protection element in plate form, especially ballistic armor component, more preferably a ballistic and/or ballistic-resistant composite armor plate, for endowing all kinds of vehicles, especially cars, trucks, utility vehicles, land vehicles or the like, with a protective function against ballistic active bodies (projectile bodies), especially against reinforcement-penetrating and/or armor-piercing projectiles, shear bodies or penetration bodies.

The present invention likewise relates to the use of at least one protective material and/or at least one protection element, preferably a ballistic protection element in plate form, especially ballistic armor component, more preferably a ballistic and/or ballistic-resistant composite armor plate, for manufacture of all kinds of objects or buildings, preferably with a protective function against ballistic active bodies (projectile bodies), especially against reinforcement-penetrating and/or armor-piercing projectiles, shear bodies or penetration bodies.

The present invention additionally relates to the use of at least one protective material and/or at least one protection element, preferably a ballistic protection element in plate form, especially ballistic armor component, more preferably a ballistic and/or ballistic-resistant composite armor plate, for endowing all kinds of objects or buildings with a protective function against ballistic active bodies (projectile bodies), especially against reinforcement-penetrating and/or armor-piercing projectiles, shear bodies or penetration bodies.

The present invention likewise relates to all kinds of vehicles, especially cars, trucks, utility vehicles, land vehicles or the like, preferably with a protective function against ballistic active bodies (projectile bodies), especially against reinforcement-penetrating and/or armor-piercing projectiles, shear bodies or penetration bodies.

The present invention likewise relates to objects or buildings, preferably with a protective function against ballistic active bodies (projectile bodies), especially against reinforcement-penetrating and/or armor-piercing projectiles, shear bodies or penetration bodies.

The present invention finally relates to a method of providing protection, preferably of personnel, against ballistic active bodies (projectile bodies), especially against reinforcement-penetrating and/or armor-piercing projectiles, shear bodies or penetration bodies.

Personnel deployed or present in the military sector and also in the field of terrorism defense, such as soldiers in military units, border guards, police officers, security personnel, but also civilians, by virtue of their deployment, be it in military combat or peacekeeping operations, antiterrorist operations and/or operations for specifically military or terrorism defense, but also necessarily owing to civil circumstances, are often confronted with an acute or at least latent risk of direct bodily harm as caused not only by the use of explosive devices or stabbing weapons but particularly also by deliberate or indiscriminate impact of ballistic projectile bodies, especially bullets, by shooting devices.

Particular mention should be made in this context of firearms as portable shooting devices, in the case of which the ballistic active bodies, especially bullets, are accelerated to high velocity by an explosive release of energy and hit a person affected with high kinetic energy, associated with usually life-threatening, sometimes immediately deadly or lethal, injuries to the person affected. In this context, firearms, in the context of aggressive or defensive combat operations, particularly for achievement of targeted trauma without direct body contact with the opponent, have become a subtle tool with a high potential for injury or endangerment.

In general, the mode of function of the aforementioned firearms and shooting devices that can be equated thereto is that the ballistic active bodies are driven out of a barrel of the firearm at high velocity by hot gases.

More particularly, the mode of function of firearms is that chemical blowing agents, for acceleration of the ballistic active body as energy carrier, when they are activated, aim to achieve a high volume, associated with the generation of an explosive increase in gas pressure that acts on the ballistic active body, such that the ballistic active body is driven through the barrel of the firearm at high velocity and subsequently moves in a ballistic flight path in the direction of a target that may or may not have been identified beforehand.

Owing to the mode of function of firearms with the explosive conversion of the chemical energy stored in the blowing agent to kinetic energy of the active body, the ballistic active bodies or bullets released by firearms have enormous penetrative power or impact energy, associated with high penetration (depth)—sometimes complete penetration—through usually physiologically important body structures, for example blood vessels, nerve tracts, organs or the like. The result is almost always serious, often life-threatening, sometimes immediately deadly or lethal, injuries to the person affected.

It can thus be stated that there is a high demand in the prior art for protection devices, especially wearable protection devices, with an effective ballistic protection function against ballistic active bodies, especially bullets released from firearms, although protective devices of this kind should also have acceptable wearer comfort, especially with achievement of low weight coupled with simultaneously high mobility and comfort.

Against this background, the prior art has followed different approaches that form a basis on which affected personnel are to be protected from the deadly effect of ballistic active bodies through shooting weapons, stabbing weapons or explosive devices. However, the known approaches do not always lead to the desired success.

Thus, one technical approach for achievement of a ballistic protection function is to use soft-ballistic protection systems in the form of multilayer mesh or film structures made of a tear-resistant woven fabric, usually based on aramid fibers. The kinetic energy of the bullet on impact is partly absorbed here in that the bullet sets the individual layers in motion in the direction of entry and additionally brings about extension of the individual fibers. The bullet itself remains in the mesh structure and thus leads to deformation of the soft-ballistic protection system, usually in the form of a bulge formed in the direction of the body of the carrier. However, a disadvantage of this approach is that the mesh or film structures based on a tear-resistant woven fabric do not offer ballistic protection against reinforcement-penetrating and/or armor-piercing ballistic active bodies.

A further technical approach for achievement of a ballistic protection function is to increase penetration resistance through use of hard-ballistic protection systems based on protection elements in plate form made of metal, ceramic or high performance plastics as an alternative or in addition to the aforementioned soft-ballistic protection systems. In this case, a majority of the kinetic energy of the active body on impact is distributed over the protection element in plate form. Through the use of and reinforcement by means of hard-ballistic protective systems, it is possible to achieve a ballistic protective function against reinforcement-penetrating and/or armor-piercing active bodies. However, protective systems of this kind are fundamentally associated with the disadvantage that, because they are in plate form, they have a high weight and are additionally inflexible or stiff, associated with low wearer comfort and consequently reduced wearer acceptance in the long term.

More particularly, it should be emphasized in this regard that, specifically in the case of long wearing or use periods in often tough conditions, appropriate mobility and/or comfort coupled with simultaneously acceptable wearing weight is an indispensable or essential requirement criterion on wearable protective devices. Furthermore, especially under use conditions, individual and/or flexible and/or situation-related adaptation of the protection devices to the geometry or shape of different regions to be protected, especially body regions, is desirable.

Moreover, the protective systems implemented in the prior art are often constructed such that momentum induced with the hitting or striking by the ballistic active body in the form of what is called "blunt trauma" is passed onto the body of the wearer in virtually unattenuated form. This can—without the presence of outward damage or direct contact with the ballistic active body—likewise lead to life-threatening injuries to internal organs of the person affected given a sufficiently heavy and fast active body or projectile.

In summary, in the prior art, the development of effective protective devices, especially against the background of comfortable employability or utility, is problematic and of relevance. Particularly in the case of hard-ballistic protection elements or those in plate form, the disadvantages cited above with regard to high weight coupled with simultaneously restricted mobility or comfort should be considered in this regard. Moreover, the problem of flexible or individual adaptation to the shape or geometry of different regions to be covered or protected, especially body regions, is taken into account insufficiently at most.

DE 10 2010 029 037 B4, for example, relates to a ballistic protective vest having a hard-ballistic back portion, wherein the back portion takes the form of a hard-ballistic insert in plate form. The insert may have been manufactured from a ceramic, a polymer or a metal. However, the insert in plate form detailed is associated with the above-described disadvantages, especially with regard to reduced wearer comfort owing to the heavy or inflexible form of the insert in plate form.

Moreover, EP 1 135 663 B1 and U.S. Pat. No. 6,170,378 B1 (a member of the same patent family) relate to a protective device with a protective function against ballistic projectiles, wherein a hard metal plating system composed of titanium sheets has been secured to an underlayer made of aramid fibers. The layer of the adhesive-impregnated aramid can be used to encase the hard metal plating system formed by the sheets. However, the metal elements in plate form detailed are associated with the above-described disadvantages with regard to elevated weight and restricted mobility or comfort. Moreover, each of the titanium sheets described is individually subjected to working with removal of material, which is associated with comparatively high production costs or manufacturing costs.

In summary, it can thus be stated that the ballistic protection devices known in the prior art that are based on soft-ballistic and/or hard-ballistic protection systems have significant drawbacks with regard to their wearer comfort and their ballistic protective function, and so wearer acceptance is impaired in the long term. More particularly, the prior art focuses on hard-ballistic protective systems on the one hand, which—as set out above—are disadvantageous with regard to appropriate wearer comfort and situation-related or individual adaptability to the geometry of regions to be protected, or on partially flexible soft-ballistic protective systems on the other hand, but these do not have ballistic protection against reinforcement-penetrating or armor-piercing ballistic active bodies.

BRIEF SUMMARY OF THE INVENTION

Against this background, therefore, it is an object of the present invention to provide a protective material having ballistic protective function, which is capable of at least substantially avoiding or else at least attenuating the disadvantages of the prior art as outlined above.

More particularly, it is an object of the present invention to provide a protective material which, by comparison with the prior art—at least with maintenance and preferably improvement of the ballistic protective function—has reduced weight coupled with simultaneously improved mobility or wearer comfort, associated with high wearer acceptance, especially over long periods of use. More particularly, the protective material of the invention is additionally to be configurable or adaptable individually, preferably under use conditions, to the shape and/or outline of regions to be covered or protected, especially body regions.

In this connection, a particular aim of the present invention is an improvement in hard-ballistic protection systems with a protective function against reinforcement-penetrating and/or armor-piercing ballistic active bodies with high impact energy or penetration force, as released, for example, from long guns having high firing power and/or from a short distance. Blunt trauma resulting from the momentum introduced by the impact of the ballistic active body is also to be counteracted in accordance with the invention.

In this regard, it should additionally be mentioned that the use of hard-ballistic protection systems, for construction-related reasons, automatically implies stab protection against stabbing weapons such as knives or needles. Consequently, the protective material of the invention is assumed to have such a protective function without any requirement for further supplementary elucidation.

To achieve the object outlined above, the present invention thus proposes—in a first aspect of the present invention—a protective material, preferably ballistic protective material with a protective function against ballistic active bodies, especially against reinforcement-penetrating and/or armor-piercing projectiles, shear bodies or penetration bodies, as provided.

The present invention further provides—in a second aspect of the present invention—a protection element, preferably ballistic protection element, especially with a protective function against ballistic active bodies (projectile bodies), especially against reinforcement-penetrating and/or armor-piercing projectiles, shear bodies or penetration bodies, as described.

The present invention further provides—in a third aspect of the present invention—a protective apparel unit, preferably a ballistic protective apparel unit, preferably with a protective function against ballistic active bodies (projectile bodies), especially against reinforcement-penetrating and/or armor-piercing projectiles, shear bodies or penetration bodies, comprising outer apparel and/or inner apparel and optionally comprising separate head and/or face protection, neck protection, shoulder protection, arm protection, hand protection, trunk protection, torso protection, genital and/or anal protection and/or leg protection, as further described.

The present invention still further provides—in a fourth aspect of the present invention—for the use of a protective material and/or protection element for manufacture of protective apparel, preferably with a protective function against ballistic active bodies, especially against reinforcement-penetrating and/or armor-piercing projectiles, shear bodies or penetration bodies, as also described.

The present invention still further provides—in a fifth aspect of the present invention—for the use of at least one protective material and/or protection element, preferably a ballistic protection element in plate form, especially ballistic armor component, more preferably a ballistic and/or ballistic-resistant composite armor plate, for endowing apparel with a protective function against ballistic active bodies (projectile bodies), especially against reinforcement-penetrating and/or armor-piercing projectiles, shear bodies or penetration bodies, as also described.

The present invention still further provides—in a sixth aspect of the present invention—for the use of at least one protective material and/or at least one protection element, preferably a ballistic protection element in plate form, especially ballistic armor component, more preferably a ballistic and/or ballistic-resistant composite armor plate, for manufacture of all kinds of vehicles, especially cars, trucks, utility vehicles, land vehicles or the like, preferably with a protective function against ballistic active bodies (projectile bodies), especially against reinforcement-penetrating and/or armor-piercing projectiles, shear bodies or penetration bodies, as described.

The present invention still further provides—in a seventh aspect of the present invention—for the use of at least one protective material and/or at least one protection element, preferably a ballistic protection element in plate form, especially ballistic armor component, more preferably a ballistic and/or ballistic-resistant composite armor plate, for endowing all kinds of vehicles, especially cars, trucks, utility vehicles, land vehicles or the like, with a protective function against ballistic active bodies (projectile bodies), especially against reinforcement-penetrating and/or armor-piercing projectiles, shear bodies or penetration bodies, as further described.

The present invention still further provides—in an eighth aspect of the present invention—for the use of at least one protective material and/or at least one protection element, preferably a ballistic protection element in plate form, especially ballistic armor component, more preferably a ballistic and/or ballistic-resistant composite armor plate, for manufacture of all kinds of objects or buildings, preferably with a protective function against ballistic active bodies (projectile bodies), especially against reinforcement-penetrating and/or armor-piercing projectiles, shear bodies or penetration bodies, as described.

The present invention still further provides—in a ninth aspect of the present invention—for the use of at least one protective material and/or at least one protection element, preferably a ballistic protection element in plate form, especially ballistic armor component, more preferably a ballistic and/or ballistic-resistant composite armor plate, for endowing all kinds of objects or buildings with a protective function against ballistic active bodies (projectile bodies), especially against reinforcement-penetrating and/or armor-piercing projectiles, shear bodies or penetration bodies, as described.

The present invention still further provides—in a tenth aspect of the present invention—all kinds of vehicles, especially cars, trucks, utility vehicles, land vehicles or the like, preferably with a protective function against ballistic active bodies (projectile bodies), especially against reinforcement-penetrating and/or armor-piercing projectiles, shear bodies or penetration bodies, as described.

The present invention still further provides—in an eleventh aspect of the present invention—objects or buildings, preferably with a protective function against ballistic active bodies (projectile bodies), especially against reinforcement-penetrating and/or armor-piercing projectiles, shear bodies or penetration bodies, as described.

The present invention finally further provides—in a twelfth aspect of the present invention—a method of providing protection, preferably of personnel, against ballistic active bodies (projectile bodies), especially against reinforcement-penetrating and/or armor-piercing projectiles, shear bodies or penetration bodies, as described.

It will be apparent that, in the description of the present invention which follows, those configurations, embodiments, advantages, examples or the like which—for the purpose of avoidance of unnecessary repetition—are set out hereinafter only for an individual aspect of the invention are of course correspondingly applicable in relation to the other aspects of the invention without requiring any explicit mention.

It will further be apparent that, in statements of values, numbers and ranges hereinafter, the slated values, numbers and ranges in this regard are not to be understood in a restrictive manner; it will be automatically apparent to the person skilled in the art that, depending on the individual case or based on the application, it is possible to depart from the ranges or figures given without having left the scope of the present invention.

Moreover, all the values or parameters or the like that are stated hereinafter can in principle be ascertained or determined by normalized or standardized or explicitly specified determination methods or else, otherwise, by methods of determination or measurement that are familiar per se to the person skilled in the art in this field. Unless stated otherwise, the underlying values or parameters are ascertained under standard conditions (i.e., more particularly, at a temperature of 20° C. and/or at a pressure of 1013.25 hPa or 1.01325 bar).

Otherwise, for all the statements of amount in relative or percentage terms that are given hereinafter, especially based on weight, it should be noted that these figures, in the context of the present invention, should be selected or combined by the person skilled in the art so as to result in a sum total—if appropriate taking account of further components or ingredients, especially as defined hereinafter—always of 100% or 100% by weight. However, this will be automatically apparent to the person skilled in the art.

Having said that, the present invention is described and elucidated in detail hereinafter, specifically also with reference to drawings or figure representations that represent embodiments of the invention and working examples.

In connection with the elucidation of these preferred embodiments and working examples of the present invention, although these are in no way restrictive in relation to the present invention, further advantages, properties and features of the present invention are also indicated.

DETAILED DESCRIPTION OF THE INVENTION

Having said that, the present invention is described further and in detail hereinafter.

The present invention thus provides—in one aspect of the invention—a protective material, preferably ballistic protective material, with a protective function against ballistic active bodies (projectile bodies), especially against reinforcement-penetrating and/or armor-piercing projectiles, shear bodies or penetration bodies, especially having a ballistics contact area, wherein the protective material has at least one hard-ballistic section assigned especially to the ballistics contact area and/or forming the ballistics contact area, especially with a protective function against ballistic active bodies (projectile bodies), especially against reinforcement-penetrating and/or armor-piercing projectiles, shear bodies or penetration bodies, wherein the hard-ballistic section has or is at least essentially formed from or consists of a multitude of ballistic and/or ballistic-resistant shaped bodies that are preferably at least essentially spherical, preferably shaped armor bodies, especially for absorbing and/or deflecting and/or distributing kinetic energy from ballistic active bodies (projectile bodies), especially reinforcement-penetrating and/or armor-piercing projectiles, shear bodies or penetration bodies.

The term "active bodies" as used in a generic manner in the context of the present invention should preferably be understood in a broad sense and especially encompasses solid bodies that are fired from a firearm and move forward on a ballistic trajectory (projectile pathway) without intrinsic energy or steering. Moreover, the above term also encompasses ballistic particles or fragments released by detonation or explosion, especially in the form of splinters, which can stem from corresponding conventional or unconventional explosive devices or the like.

The term "ballistic contact area" as used in the context of the present invention is understood to mean a region, especially a surface region, of the protective material, especially of the hard-ballistic section, which, in the wearable state or usable state (use state), is subject to, in particular, direct contact with the active bodies and/or is assigned to a region to be protected, especially body region.

Moreover, the term "hard-ballistic section" in the context of the present invention is understood to mean a portion of the protective material, especially a layer of the protective material, which is exposed to direct contact of ballistic active bodies as a penetration-resistant protective system. In other words, the hard-ballistic section forms resistance against penetration of the active body and thus is crucial in determining the ballistic protective function achieved by the protective material.

The term "shaped body" as used in the context of the present invention is preferably understood to mean an armor element, especially armor component, which is assigned to the hard-ballistic section and includes or forms the ballistic contact area. Consequently, the shaped body in the context of the present invention is subject to direct contact with the active bodies and especially designed to absorb and/or deflect and/or distribute the kinetic energy from the ballistic active bodies. More particularly, the hitting or striking active body—especially with plastic deformation of the shaped body—is deflected and/or divided into individual fragments by the shaped body.

According to the invention, the hard-ballistic section is thus formed using a multitude of at least essentially spherical shaped bodies, wherein the at least essentially spherical form of the shaped bodies and the arrangement thereof relative to one another is automatically associated with the formation of cavities or empty volumes within the hard-ballistic section and consequently—especially by comparison with hard-ballistic protective systems in monolithic or one-piece form (especially plate-based)—is associated with a reduction in the (material) density and hence in the weight of the protective material, especially of the hard-ballistic section.

The conception of the invention leads to a significant reduction in the weight of the protective material, such that, based on the conception of the invention, an extremely user-friendly protective material overall is provided, wherein—as set out in detail hereinafter—the ballistic protective function of the protective material of the invention is at least essentially maintained or particularly even improved over conventional protection elements, especially in plate form.

Moreover, the concept of the invention achieves a weight-saving and simultaneously effective ballistic protective function. In other words, this means that the protective material of the invention, given the same thickness and/or reduced starting weight, enables either an equivalent or even improved ballistic protective function and/or (at the same level of threat) a significant reduction in weight of the protective material.

Furthermore, the concept of the invention, by virtue of the controlled dimensions and/or number of shaped bodies used, enables individual or situation-related adaptation of the ballistic protective function to the level of threat to be expected and/or the outline and/or the shape of the region to be covered or to be protected, especially body region. This enables universal applicability with simultaneous optimization or inexpensive production of the protective material of the invention.

Moreover, the protective material of the invention also has the feature of improved mobility since the formation of cavities or empty volumes within the hard-ballistic section achieves at least partial deformability, especially flexibility, of the protective material. In this connection, the concept of the invention further permits, in the usable state and/or wearable state (use state), controlled adaptation of the protective material to the shape or geometry of regions to be protected and/or to be covered, especially body regions.

In addition, an active body hitting the shaped body, owing to the at least essentially spherical form of the shaped bodies, is deflected, such that the impact force emanating from the active body is distributed over a greater impact area. This leads to a further improvement in the penetration characteristics of the protective material of the invention, which means, in other words, that, given the same thickness or a reduced starting weight, either retention or even an increase in the ballistic protective function and/or, at a lower level of threat, a reduction in weight of the protective material of the invention is enabled.

Moreover, the multitude of separate shaped bodies enables distribution, especially structured distribution, of the kinetic energy introduced by the active body, such that—especially against the background of multiple hits—the protective material of the invention enables a ballistic protective function with long-term robustness.

Furthermore, the cavities or empty volumes enclosed between the shaped bodies, as material interruptions, counteract the spread of cracks within the hard-ballistic section, which overall assures robust long-term use—especially with provision of long-term dimensional stability or functionality—of the protective material of the invention.

Another feature of the protective material of the invention is excellent water vapor permeability or breathability, which, more particularly, is significantly improved compared to prior art protective materials in the form of solid plates.

Thus, the protective material of the invention ultimately combines, by virtue of the specific geometric form of a multitude of ballistic-resistant shaped bodies, reliable ballistic protection—especially against reinforcement-penetrating and/or armor-piercing active bodies—and optimized wearer comfort or prolonged high wearer acceptance with simultaneously resource-conserving production and flexible adaptation capacity, which leads overall to a high-performance ballistic protective material with improved application and production properties, reduced intrinsic weight and elevated wearer comfort, especially also improved breathability or water vapor permeability.

In this regard, it should additionally be mentioned that, in the context of the preferably hard-ballistic protective function, for construction-related reasons, stab protection against stabbing weapons such as knives or needles is likewise implicit. Consequently, in the context of the present invention, such a protective function is given or is assumed without additional remarks in this regard.

It will be apparent that, in the description of the present invention which follows, those configurations, embodiments, advantages, examples or the like which—for the purpose of avoidance of unnecessary repetition—are set out hereinafter only for an individual aspect of the invention are of course also correspondingly applicable in relation to the other aspects of the invention without requiring any explicit mention.

It will further be apparent that, in statements of values, numbers and ranges hereinafter, the stated values, numbers and ranges in this regard are not to be understood in a restrictive manner; it will be automatically apparent to the person skilled in the art that, depending on the individual case or based on the application, it is possible to depart from the ranges or figures given without having left the scope of the present invention.

Moreover, all the values or parameters or the like that are stated hereinafter can in principle be ascertained or determined by normalized or standardized or explicitly specified determination methods or else, otherwise, by methods of determination or measurement that are familiar per se to the person skilled in the art in this field. Unless stated otherwise, the underlying values or parameters are ascertained under standard conditions (i.e., more particularly, at a temperature of 20° C. and/or at a pressure of 1013.25 hectopascal or 1.01325 bar).

Otherwise, for all the statements of amount in relevant or percentage terms that are given hereinafter, especially based on weight, it should be noted that these figures, in the context of the present invention, should be selected or combined by the person skilled in the art so as to result in a sum total—if appropriate taking account of further components or ingredients, especially as defined hereinafter—always of 100% or 100% by weight. However, this will be automatically apparent to the person skilled in the art.

Having said that, the present invention is described and elucidated in detail hereinafter, also with reference to drawings or figure representations that represent preferred embodiments and working examples.

Figure 1A:
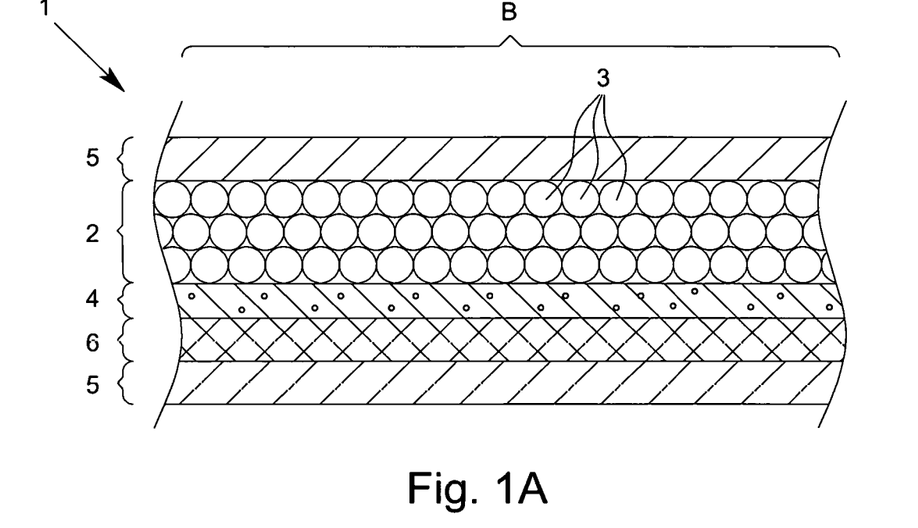
FIG. 1A provides a schematic cross-sectional diagram of the construction of a protective material of the invention in one embodiment of the invention with one hard-ballistic section.
Figure 1B:
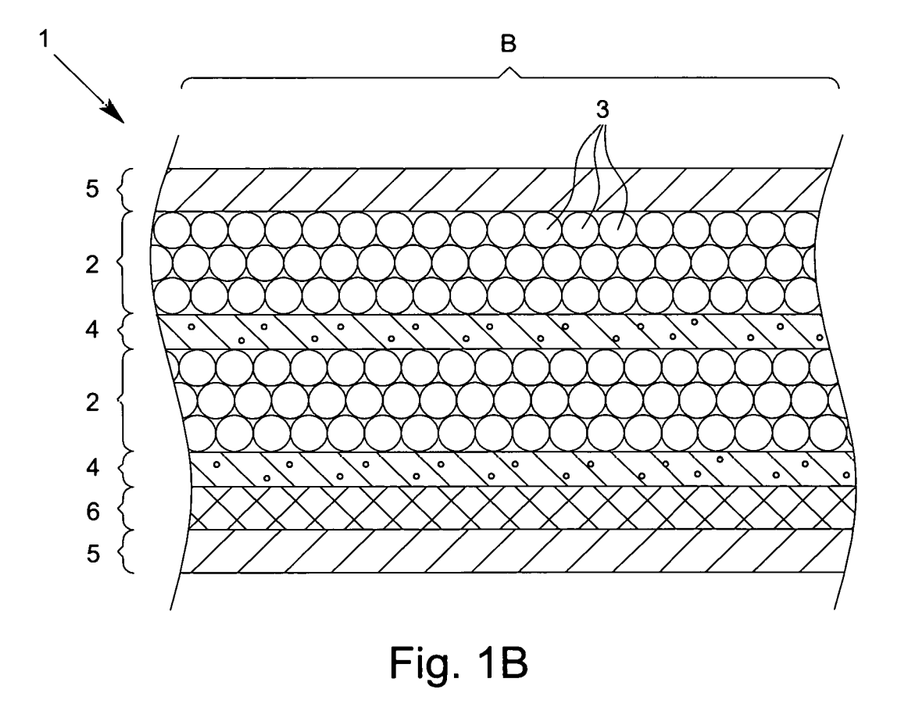
FIG. 1B provides a schematic cross-sectional diagram of the construction of a protective material of the invention in an alternative embodiment of the invention with multiple hard-ballistic sections.
Figure 2:
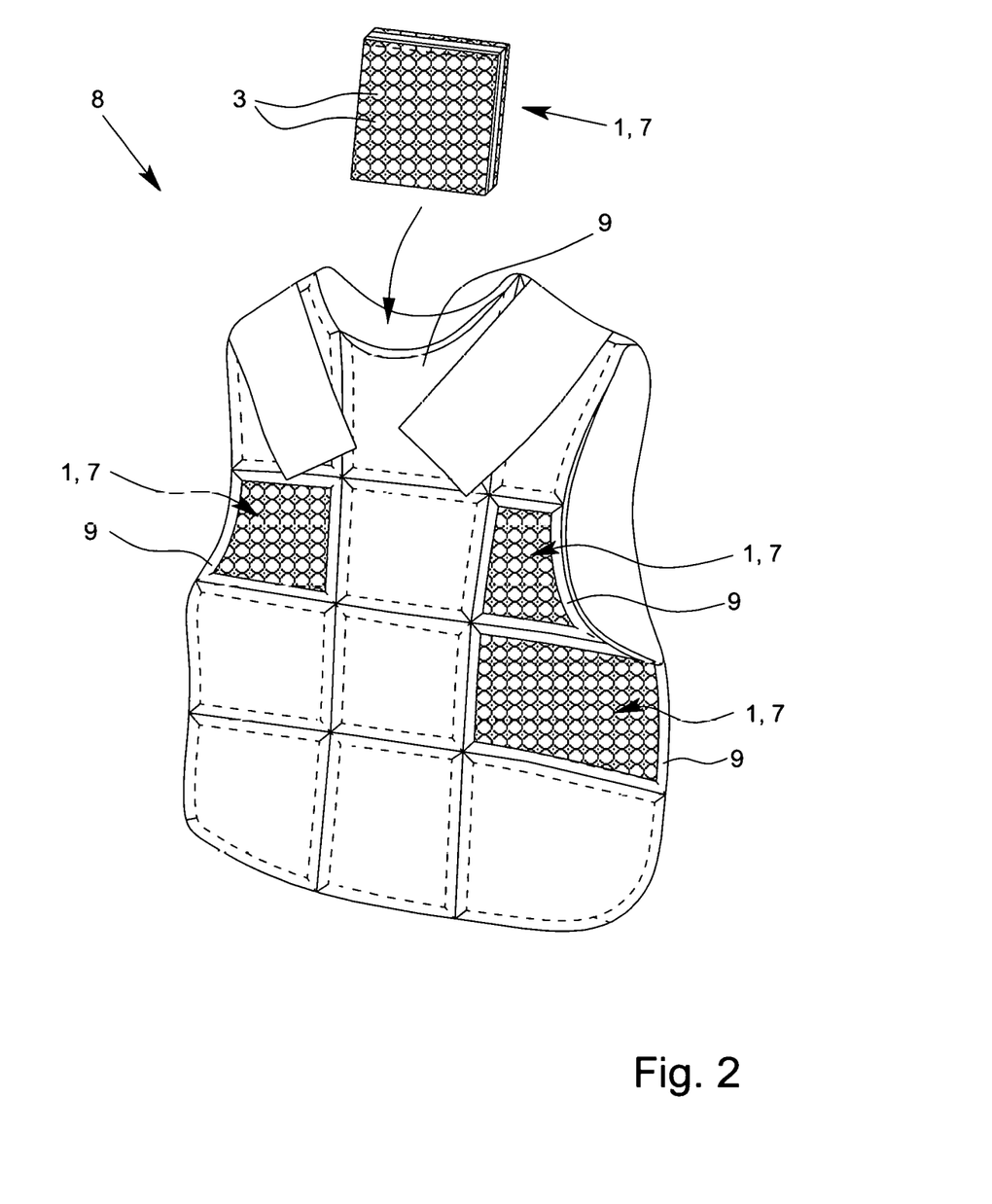
FIG. 2 provides a schematic perspective view of a protective apparel item of the invention in the form of a ballistic protective vest comprising protection elements of the invention, wherein the protection elements of the invention are assigned to different body regions in the wearable state and/or cover different body regions in the wearable state.
Figure 3:
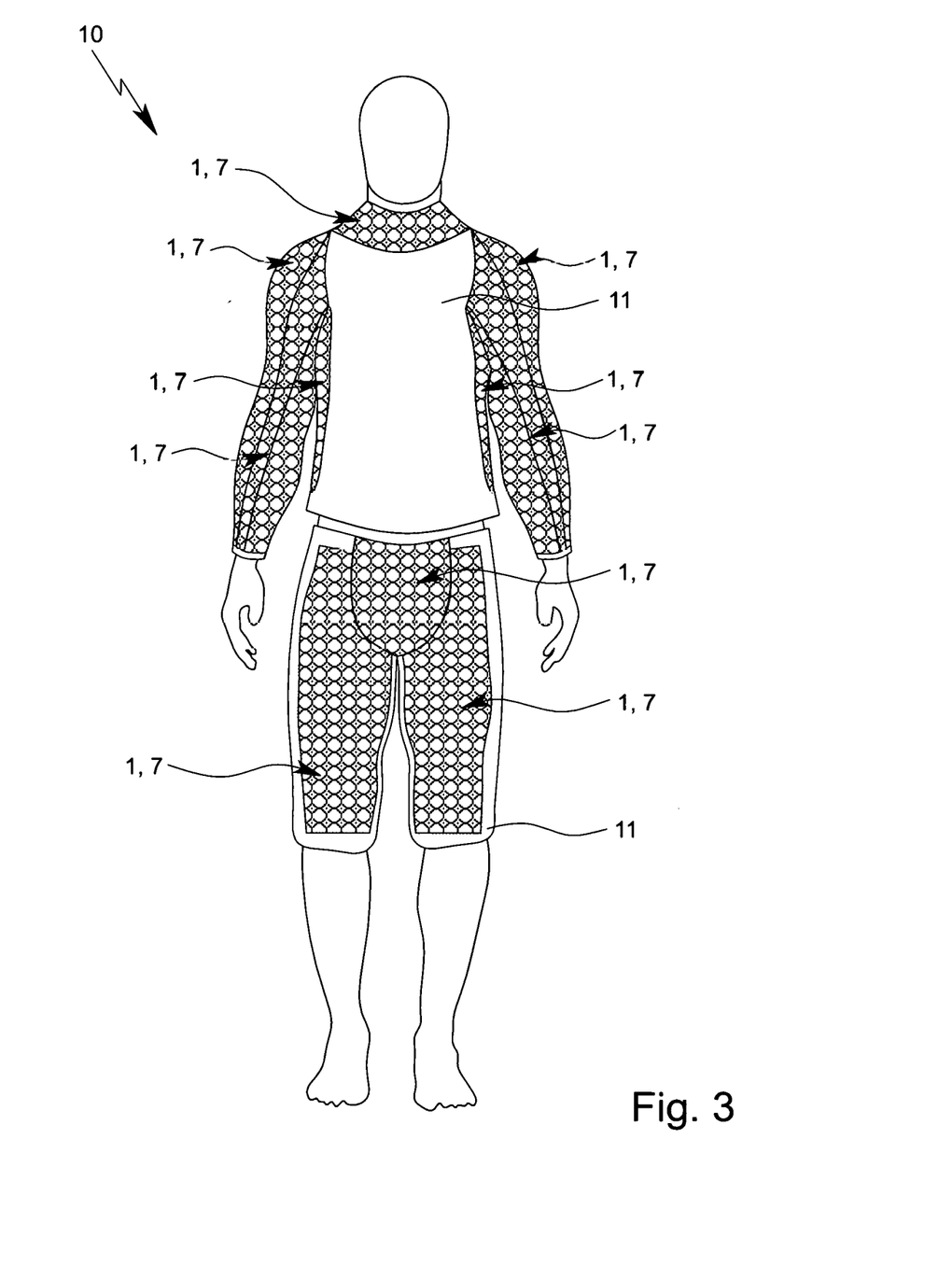
FIG. 3 provides a schematic front plan view of a protective apparel unit of the invention comprising protection elements of the invention, wherein the protection elements of the invention are assigned to different body regions in the wearable state and/or cover different body regions in the wearable state.

The figure representations show:

FIG. 1A a schematic cross-sectional diagram of the construction of a protective material of the invention in one embodiment of the invention with one hard-ballistic section;

FIG. 1B a schematic cross-sectional diagram of the construction of a protective material of the invention in an alternative embodiment of the invention with multiple hard-ballistic sections;

FIG. 2 a schematic perspective view of a protective apparel item of the invention in the form of a ballistic protective vest comprising protection elements of the invention, wherein the protection elements of the invention are assigned to different body regions in the wearable state and/or cover different body regions in the wearable state; and FIG. 3 a schematic front plan view of a protective apparel unit of the invention comprising protection elements of the invention, wherein the protection elements of the invention are assigned to different body regions in the wearable state and/or cover different body regions in the wearable state.

FIGS. 1A and 1B each show a schematic cross-sectional diagram of the construction of a protective material 1 of the invention, preferably ballistic protective material with a protective function against ballistic active bodies (projectile bodies), especially against reinforcement-penetrating and/or armor-piercing projectiles, shear bodies or penetration bodies. The protective material 1 of the invention has at least one hard-ballistic section 2, especially with a protective function against ballistic active bodies (projectile bodies), especially against reinforcement-penetrating and/or armor-piercing projectiles, shear bodies or penetration bodies.

In this connection, it is possible in accordance with the invention to vary the number of hard-ballistic sections 2 within the protective material 1. Thus, FIG. 1A shows the protective material 1 of the invention with one hard-ballistic section 2, and FIG. 1B the protective material 1 of the invention with two hard-ballistic sections 2. According to the invention, this hard-ballistic section 2 comprises a multitude of at least essentially spherical shaped bodies 3, preferably shaped armor bodies, especially for absorbing and/or deflecting and/or distributing kinetic energy from the ballistic active bodies, especially reinforcement-penetrating and/or armor-piercing projectiles, shear bodies or penetration bodies.

As can additionally be inferred from FIGS. 1A and 1B, the protective material 1 has a ballistic contact area B. The ballistic contact area B is preferably assigned to the hard-ballistic section 2. More particularly, the ballistic contact area B is formed by the hard-ballistic section 2. In this connection, it is advantageous when the ballistic contact area B in the usable state (use state) and/or wearable state is subjected to preferably direct contact with the ballistic active bodies (projectile body), especially in the form of hitting and/or striking and/or penetrating. Moreover, it is advantageous in accordance with the invention when the ballistic contact area B in the usable state (use state) and/or wearable state is assigned to a region to be protected, especially body region, and/or when the ballistic contact area B in the usable state (use state) and/or wearable state covers a region to be protected, especially body region.

In this connection, the situation in the context of the present invention is especially such that the hard-ballistic section 2 is in layered, preferably two-dimensional form, especially with two opposite sides, such that the ballistic contact area B is formed by one side of the hard-ballistic section 2.

With regard to the arrangement or positioning of the shaped bodies 3, it may be the case in accordance with the invention that the shaped bodies 3 are arranged regularly or irregularly within the hard-ballistic section 2.

The term "regularly" as used in accordance with the invention with regard to the arrangement of the shaped bodies 3 within the hard-ballistic section 2 should especially be understood such that the shaped bodies 3 are arranged relative to one another within the hard-ballistic section 2 in the form of a homogeneous, three-dimensional pattern.

As shown in schematic form in FIGS. 1A and 1B, the shaped bodies 3 within the hard-ballistic section 2 may be arranged at least essentially adjoining one another and/or at least essentially touching one another.

In that context, the terms "adjoining one another" and/or "touching one another" as used in the context of the present invention refer not just to direct or immediate contact of the shaped bodies 3 with one another. In addition, the aforementioned terms also include non-immediate or indirect connection, for example owing to a binder between the respective contact regions of the shaped bodies 3.

By virtue of the multitude of shaped bodies 3 being arranged adjoining one another and/or touching one another within the hard-ballistic section 2—without wishing to be restricted to this theory—effective distribution and/or onward conduction and/or division of the kinetic energy and/or incident force introduced by the active body is achieved via the multitude of shaped bodies 3. By virtue of the distribution or division of the kinetic energy and/or impact force owing to striking and/or penetrating of the ballistic active body over the multitude of shaped bodies 3, local stress peaks within the hard-ballistic section 2 are effectively degraded or conducted onward, which results overall in improvement in the stability of the protective material 1—especially with regard to local exceedance of the cracking stress, associated with splintering or detachment of fragments from the individual shaped bodies 3.

It may additionally be the case in accordance with the invention that the shaped bodies 3 are arranged one on top of another in layers within the hard-ballistic section 2, especially in layered or stacked form.

In this connection, it is advantageous in accordance with the invention when every upper layer of shaped bodies 3 is supported by the lower layer of shaped bodies 3. More particularly, for this purpose, the shaped bodies 3 that have been arranged one on top of another in layers and/or stacked partly intermesh with one another, such that the shaped bodies 3 that have been arranged one on top of another in layers and/or stacked are held and/or mounted relative to one another, especially in radial direction.

It is likewise advantageous in accordance with the invention when the shaped bodies 3 have at least essentially the same size, preferably at least essentially the same diameter. More particularly, it is advantageous in this connection in accordance with the invention when the spherical shaped bodies 3 are in contact with one another over their greatest diameters in the longitudinal extent and in the widthwise extent. This achieves a homogeneous compressive stress distribution across the hard-ballistic section 2 over a multitude of spherical shaped bodies 3 having the same diameter, which further minimizes the occurrence of local stress peaks, associated with local material failure.

More particularly, the multitude of shaped bodies 3 are arranged relative to one another with maximum density within the hard-ballistic section 2.

In this regard, the situation in accordance with the invention is especially that the shaped bodies 3 are arranged within the hard-ballistic section 2 such that the volume differential between the total volume of the hard-ballistic section 2 on the one hand and the sum total of the component volumes occupied by each individual shaped body 3 on the other hand is at least essentially minimized. It is preferable in accordance with the invention when the aforementioned volume differential is less than 50% by volume, preferably less than 40% by volume, more preferably less than 35% by volume, especially preferably less than 30% by volume, of the total volume of the hard-ballistic section 2. By virtue of the total volume available within the hard-ballistic section 2 being occupied essentially by the multitude of shaped bodies 3 with ballistic protective function, the protective function of the protective material 1 against the ballistic active bodies is improved overall. Furthermore, a particularly stable or robust arrangement, especially stacking, of the shaped bodies 3 is enabled within the hard-ballistic section 2 with minimization of the cavities or empty volumes formed between the shaped bodies 3.

With regard to the proportion by volume of the shaped bodies 3, based on the total volume of the hard-ballistic section 2, it is preferable in accordance with the invention when the proportion by volume of the shaped bodies 3 is in the range from 20% by volume to 99% by volume, preferably in the range from 30% by volume to 95% by volume, more preferably in the range from 40% by volume to 90% by volume, even more preferably in the range from 50% by volume to 85% by volume, further preferably still in the range from 60% by volume to 80% by volume.

In the context of the present invention, it may additionally be the case that the proportion by weight of the shaped bodies 3, based on the total weight of the hard-ballistic section 2, is in the range from 20% by weight to 99% by weight, preferably in the range from 30% by weight to 98% by weight, more preferably in the range from 40% by weight to 97% by weight, even more preferably in the range from 50% by weight to 96% by weight, further preferably still in the range from 60% by weight to 95% by weight. By virtue of the majority of the total weight of the hard-ballistic section 2 being formed by the multitude of the at least essentially spherical shaped bodies 3 with ballistic protective function, the protective effect of the protective material 1 against ballistic active bodies is further optimized.

With regard to the shaped bodies 3, moreover, the size thereof, especially the diameter thereof, can vary within wide ranges. However, it has been found to be useful when the size, especially the diameter, of the shaped bodies 3 is in the range from 0.1 mm to 10 cm, preferably in the range from 0.5 mm to 5 cm, more preferably in the range from 1 mm to 4 cm, even more preferably in the range from 2 mm to 3 cm, more preferably still in the range from 5 mm to 2 cm. The above figures should preferably be regarded as the average diameter of the shaped bodies 3, determined, for example and in a non-restrictive manner, by standard methods such as laser diffraction or sieve analysis, which is well-known to the person skilled in the art.

Moreover, according to the conception of the invention, it may be the case that the shaped bodies 3 have been manufactured from a ballistic-resistant hard material, especially from a hard material resistant and/or impenetrable and/or penetration-resistant to ballistic active bodies (projectile bodies).

The term "ballistic-resistant" as used in accordance with the invention should be understood in a broad sense and relates more particularly to the propensity of a material to counteract an impact force or penetration force of an especially ballistic active body, and in this way to prevent penetration or puncturing of the active body. In this connection, the material of the shaped body 3 is at least partially, preferably plastically, deformable, in which case at least partial destruction, for example in the form of detachment of splinters or fragments owing to the impact or striking of the active body is also possible.

In this connection, in accordance with the invention, the shaped bodies 3 have especially been manufactured from a hard material selected from the group of (i) polymer materials, preferably polyolefins such as polyethylenes or polypropylenes, especially impact-resistant and/or metal- or fiber-reinforced polymer materials, more preferably Ultra High Molecular Weight Polyolefins (UHMW-PO); (ii) metallic materials, especially steel; (iii) ceramic materials; (iv) inorganic, especially (semi)metallic carbides, nitrides, silicides and oxides, especially aluminum oxides, beryllium oxides, silicon oxides, silicon carbides, silicon nitrides, boron carbides and boron nitrides; and (v) mixtures or combinations of the aforementioned materials.

In the context of the present invention, it has especially been found to be advantageous when the shaped bodies (3) have especially been manufactured from a hard material selected from the group of (i) metallic materials, especially steel; (ii) ceramic materials; (iii) inorganic, especially (semi)metallic carbides, nitrides, silicides and oxides, especially aluminum oxides, beryllium oxides, silicon oxides, silicon carbides, silicon nitrides, boron carbides and boron nitrides; and (iv) mixtures or combinations of the aforementioned materials.

With regard to the hardness of the shaped bodies 3 and/or the material of the shaped bodies 3, this can vary within wide ranges depending on the degree of the level of threat to be expected. However, it has been found to be advantageous that the shaped bodies 3 have and/or the material of the shaped bodies 3 has a Vickers hardness of at least 1200 HV, preferably at least 1600 HV, especially of at least 1800 HV, even more preferably of at least 2000 HV, especially determined according to DIN EN ISO 6507, and/or in that the shaped bodies 3 have and/or the material of the shaped bodies 3 has a Vickers hardness in the range from 1200 HV to 10 000 HV, preferably in the range from 1600 HV to 9000 HV, especially in the range from 1800 HV to 8000 HV, even more preferably in the range from 2000 HV to 6000 HV, especially determined according to DIN EN ISO 6507.

The hardness values reported in accordance with the invention, determined after Vickers according to DIN EN ISO 6507, are based here especially on a procedure in the macro range at a test force in the range from 49.03 N to 980.7 N, a contact time in the range from 10 s to 15 s and a test temperature in the range from 10° C. to 35° C.

As described above, it has been found to be advantageous in the context of the present invention when the shaped bodies 3 have especially been manufactured from a ballistic-resistant material, preferably hard material, especially from a material resistant and/or impenetrable and/or penetration-inhibiting to ballistic active bodies (projectile bodies), preferably hard material especially as described above. In a particular embodiment, the shaped bodies 3 here may be formed from or consist of solid material, especially in the form of solid spheres. In an alternative particular embodiment, the shaped bodies 3 here may alternatively take the form of (shaped) hollow bodies, especially in the form of hollow spheres; this can bring about a significant weight saving (for example by 20% to 30% compared to the solid material). In another alternative particular embodiment, however, the shaped bodies 3 may also be formed from entangled and/or aggregated threads or (mono)filaments, especially textile threads, preferably metal or polymer material threads or (mono)filaments (in which case the polymer materials used may be the materials mentioned hereinafter, such as, more particularly, aramids, high-performance polyolefins, for example HPPEs or UHMW-PEs, high-performance polyesters, etc.); in this embodiment, it is also possible to bring about a significant weight saving compared to the solid material.

In a preferred embodiment, the shaped bodies (3) are bonded to one another, especially permanently and/or cohesively bonded to one another, especially by means of at least one binder and/or by means of sintering, soldering, welding or the like.

The term "binder" as used in the context of the present invention preferably describes a material by which solids are bonded to one another or bonded on a substrate, especially adhesive-bonded. Binders are preferably usually added in liquid form to the solid material to be bound.

With regard to the bonding of the shaped bodies 3 to one another, it may be the case in accordance with the invention that the shaped bodies 3—especially for formation of the hard-ballistic section 2—are bonded to one another, especially bonded to one another permanently and/or cohesively, especially by means of sintering, soldering, welding or the like.

It may likewise be the case in this connection, in accordance with the invention, that the shaped bodies 3 are bonded to one another by means of at least one binder to form the hard-ballistic section 2.

More particularly, the situation in the context of the present invention is such that the shaped bodies 3, for formation of a coherent, especially structured microstructure, especially of a preferably multilayer and/or multicomponent composite material, are bonded to one another, especially in a form-fitting or permanent and/or cohesive manner, preferably by means of the binder and/or by means of sintering, soldering, welding or the like.

More particularly, it is preferable in the context of the present invention when the binder is selected from the group of inorganic binders, especially mineral, hydraulic, nonhydraulic, hard-metallic carbide or ceramic binders, especially based on cement, clays and aluminas, waterglass or silicates. In addition, however, it is also possible to use organic binders, especially synthetic resin dispersions or two-component reactive resins. In addition, it is likewise possible to select the binder from the group of polymer materials, preferably polysulfides, polyurethane, epoxides, silicone and/or silane-terminated polymers. In addition, it is likewise possible to use adhesives, preferably organic-based and/or polymer-based adhesives, especially hotmelt adhesives, preferably reactive hotmelt adhesives, as binder of the invention. In addition, mixtures or combinations of the aforementioned groups or materials are also possible for formation of the binder.

More particularly, the binder in the cured state is in at least partially deformable form, preferably in at least partially elastic and/or reversibly deformable and/or partially flexible form. In the usable state (use state) and/or wearable state, this permits preferably elastic, relative movement of the shaped bodies 3 bonded to one another by means of a binder.

According to the invention, it has additionally been found to be advantageous when the protective material 1, in addition to the hard-ballistic section 2, has at least one soft-ballistic section 4, and/or the protective material 1 also has at least one soft-ballistic section 4.

The term "soft-ballistic section" as used in the context of the present invention especially relates to an at least partly flexible ballistic protective system based on a preferably meshlike or weavelike structure. The soft-ballistic section 4, by comparison with the hard-ballistic section 2, has a certain extensibility, which brings about energy absorption or adsorption of the projectile energy or kinetic energy introduced by the active body. More particularly, the ballistic protective function of the soft-ballistic section 4 is reduced compared to the hard-ballistic section 2 in that the soft-ballistic section 4 does not have effective ballistic protection against reinforcement-penetrating or armor-piercing active bodies.

The specific inventive combination of at least one hard-ballistic section 2 and a soft-ballistic section 4 improves the ballistic protective function of the protective material 1 overall, especially wherein the partially extensible soft-ballistic section 4, in addition to the protective function of the hard-ballistic section 2, enables an improvement in the shock-absorbing propensity of the protective material 1 overall, especially with regard to a reduction in the blunt trauma that acts on the wearer.

More particularly, the situation in the context of the present invention is such that the soft-ballistic section 4 preferably has a layered, preferably two-dimensional construction, especially with two opposite sides, wherein the soft-ballistic section 4 is arranged in the protective material 1 and/or relative to the hard-ballistic section 2 such that, in the usable state (use state) and/or wearable state, the soft-ballistic section 4 is not subject to any direct contact with ballistic active bodies and/or such that preferably exclusively the hard-ballistic section 2, especially one side of the hard-ballistic section 2, is subject to direct contact of ballistic active bodies (projectile bodies), especially in the form of hitting and/or striking and/or penetration. In other words, the soft-ballistic section 4 in the usable state (use state) and/or wearable state is subject at most to indirect contact of ballistic active bodies, especially in the form of fragments of the active body and/or splinters or fragments detached from the shaped body 3 as a result of the impact of the active body. More particularly, the soft-ballistic section 5 thus forms effective splinter protection against splinters or fragments detached from the active bodies and/or shaped bodies 3, with reduced impact energy or penetration force—especially compared to the reinforcement-penetrating and/or armor-piercing active bodies.

In this connection, the hard-ballistic section 2 and the soft-ballistic section 4 may be loosely stacked one on top of another. According to the invention, however, it is advantageous when the soft-ballistic section 4 is bonded, especially permanently bonded, to the hard-ballistic section 2, preferably by adhesive bonding, stapling, stitching or the like.

In certain embodiments, the protective material (1) exhibits at least a partly deformable and/or flexible and/or extensible form, especially in at least partially elastic and/or reversibly deformable and/or flexible and/or extensible form. Further, the hard-ballistic section (2) and/or the protective material (1) has a splinter protection and/or ballistic protection value $V_{50}$, determined according to STANAG 2920, of at least 180 m/s, especially at least 200 m/s, preferably at least 225 m/s, more preferably at least 250 m/s, especially preferably at least 300 m/s, most preferably at least 500 m/s. Still further, the soft-ballistic section (4) has a splinter protection and/or ballistic protection value $V_{50}$, determined according to STANAG 2920, in the range from 180 m/s to 800 m/s, especially 200 m/s to 750 m/s, preferably 225 m/s to 700 m/s, more preferably 250 m/s to 650 m/s, especially preferably 275 m/s to 600 m/s, very especially preferably 300 m/s to 550 m/s, even further preferably 325 m/s to 525 m/s, further preferably again 350 m/s to 525 m/s.

According to the invention, it is additionally advantageous when the soft-ballistic section 4 is manufactured from a polymer material, especially selected from the group of aramids or high-performance polyolefins, especially ultrahigh-molecular weight polyethylenes. With regard to the formation of the soft-ballistic section 4, it is preferable in accordance with the invention when the soft-ballistic section 4 takes the form of a preferably textile fabric or of a preferably textile two-dimensional (sheetlike) material, especially in the form of a weave, loop-formed knit, loop-drawn knit, scrim, web or nonwoven, as illustrated in schematic form in the section diagrams of FIGS. 1A and 1B.

It is likewise the case in accordance with the invention that the soft-ballistic section 4 comprises or consists of fibers and/or yarns based on polymer materials, especially selected from the group of aramids or polybenzazoles or high-performance polyolefins, especially high-performance polyethylenes, especially ultrahigh molecular weight polyethylenes. Moreover, it is also possible to use high-performance polyesters (high-strength polyesters) and copolymer combinations and mixtures thereof.

With regard to the present invention, moreover, in relation to the material of the soft-ballistic section 4, at least one ultrahigh-molecular weight polyolefin, especially at least one ultrahigh-molecular weight polyethylene (Ultra High Molecular Weight Polyolefin (UHMW-PO)), is used, especially in the form of a yarn or a thread or a filament, more preferably in the form of a yarn, to form a two-dimensional textile structure. In this connection, the applicant has found, in a completely surprising manner, that the use of such a specific material is particularly suitable for formation of the soft-ballistic section 4 and has significant advantages over the materials envisaged in the prior art, for example based on aramids. Thus, the ultrahigh-molecular weight polyethylene used in accordance with the invention to form the soft-ballistic section 4 in the form of yarns or threads or filaments has a very high tensile strength and high ductility, high fracture or bending resistance and a very high modulus of elasticity. Moreover, UHMW-PE is moisture- and UV-resistant, which likewise leads to the materials used in accordance with the invention having a high wash resistance, associated with a high stability or sustainability of the ballistic protective function. Moreover, the materials based on UHMW-PE used are physiologically safe and skin-friendly, such that no skin irritation is caused on wearing of the protective apparel item 8 of the invention. Moreover, the material used has very good chemical stability and excellent bacterial stability.

In addition, it may be the case in accordance with the invention that the soft-ballistic section 4 is in the form of a film.

With regard to the protective material 1 of the invention, moreover, it is preferable in accordance with the invention when the hard-ballistic section 2 and the soft-ballistic section 4 form a composite material. In this connection, it may be the case in accordance with the invention that the protective material 1 has multiple hard-ballistic sections 2 and soft-ballistic sections 4 preferably arranged one on top of another in alternation, preferably to form a multilayer composite material. For this purpose, reference may be made especially to the embodiment of the protective material 1 of the invention illustrated in FIG. 1B.

The formation of the protective material 1 in the form of a multilayer composite material composed of hard-ballistic sections 2 and soft-ballistic sections 4 arranged one on top of another in alternation is in principle associated with the advantage that the projectile energy or kinetic energy introduced by the active body is both distributed particularly effectively across the thickness of the protective material 1 via the hard-ballistic section 2 and absorbed by the soft-ballistic section 4. Depending on the number of hard-ballistic sections 2 and soft-ballistic sections 4 arranged one on top of another in alternation, it is thus possible to achieve a successive or continuous increase in the ballistic protective function against reinforcement-penetrating and/or armor-piercing active bodies, combined with a simultaneous improvement in shock absorption or reduction in the blunt trauma passed on to the person affected.

According to the invention, the protective material 1 may thus preferably have multiple soft-ballistic sections (5), where these may be identical or different from one another.

Furthermore, it may be the case in accordance with the invention that the protective material 1 also has at least one covering section 5, preferably in the form of a two-dimensional textile material, and/or in that the protective material 1, in addition to the hard-ballistic section 2 and optionally a soft-ballistic section 4, has at least one covering section 5, preferably in the form of a two-dimensional textile material. The covering section 5 may have a layered construction, especially with two opposite sides. More particularly, both the covering section 5 and the hard-ballistic section 2 are each in a layered construction, especially each with two opposite sides, especially wherein the covering section 5 is arranged within the protective material 1 such that, in the usable state (use state) and/or wearable state, the covering section 5 is not subject to any direct contact with ballistic active bodies and/or in that the hard-ballistic section 2 is subject to direct contact with ballistic active bodies.

More particularly, the hard-ballistic section 2 preferably forms a composite material together with the covering section 5 and optionally a soft-ballistic section 4.

In the embodiments shown in FIGS. 1A and 1B, it is preferable in accordance with the invention that the protective material 1 has two covering sections 5 arranged on opposite sides of the protective material 1.

In this connection, the sections 2, 4 and 5 arranged one on top of another in layers may be bonded loosely one on top of another and/or detachably to one another. According to the invention, however, it is preferable when the covering section 5 is bonded, especially permanently bonded, to the rest of the protective material 1, especially to the sections 2, 4 adjoining the covering section 5, preferably by bonding, stapling, stitching or the like.

In the context of the present invention, it has been found to be advantageous when the covering section 5 is in fire-resistant and/or flame-resistant form.

In addition, it may be advantageous in accordance with the invention when the covering section 5 has antimicrobial or antibacterial properties and/or corresponding camouflage properties, in which case the materials in question can likewise have high hydrophilicity for improvement of the transportation of liquid away, which further improves wearer comfort.

The covering section 5 may include at least one material, especially in the form of a yarn, a thread and/or a filament, from the group of natural substances and synthetic substances, preferably from the group of cotton; wool; linen; polyesters; polyolefins; polyvinyl chloride; polyvinylidene chloride; acetate; triacetate; polyacrylic; polyamide; polyvinyl alcohol; polyurethane; polyvinyl esters and mixtures thereof.

In this connection, the covering material 5 may function to some degree as outer material, in which case special properties can be provided in this regard, such as the above-cited fire-resistant or flame-resistant properties. Moreover, the material can be visually configured individually, for example in connection with the provision of a camouflage function. The covering section 5 may likewise have antimicrobial, especially antibacterial, properties.

In relation to the working examples shown in FIGS. 1A and 1B, however, it is additionally possible to arrange the covering section 5 to some degree as an outer material and/or, in the wearable state, on a side of the protective material 1 facing the wearer.

In this connection, it may be the case in accordance with the invention that the covering section 5 is manufactured from a material in the form of an ultrahigh-molecular weight polyethylene (Ultra High Molecular Weight Polyolefin (UHMW-PO)). In this connection, reference is made additionally to the remarks with regard to the preferred material in connection with the soft-ballistic section 5. The use of materials based on UHMW-PE offers the particular advantage that materials of this kind are physiologically safe and skin-friendly, and so no skin irritation is caused in the course of wearing the protective material 1 of the invention. Moreover, the material used has very good chemical stability and excellent bacterial stability.

More particularly, it may be appropriate in the context of the present invention that the shaped bodies 3 of the hard-ballistic section 2 are fixed by means of a binder applied especially in dot form on the soft-ballistic section 4 and/or the covering section 5.

With regard to the bonding of the shaped bodies 3 to one another by means of the binder, it may be the case in accordance with the invention that the binder for bonding of the shaped bodies 3 is disposed in the region of the common contact regions of the shaped bodies 3 to one another. In an alternative embodiment, however, it is also possible that the binder for bonding of the shaped bodies 3 is disposed within the hollow cavities or empty volumes formed between the shaped bodies 3 and/or at least essentially fills them.

For formation of the protective material 1 of the invention, it may additionally be the case that the protective material 1 additionally has at least one adsorption section 6, especially with protective function against chemical and/or biological poisons or warfare agents, preferably in the form of activated carbon particles, especially in the form of granular form (granular charcoal) or bead form (bead charcoal).

In this connection, it is preferable in the context of the present invention when the adsorption section 6 has a layered construction, especially with two opposite sides.

In this connection, it is especially preferable when the adsorption section 6 and the hard-ballistic section 2 are each in a layered construction, especially each with two opposite sides, especially wherein the adsorption section 6 is arranged within the protective material 1 such that, in the usable state (use state and/or wearable state), the adsorption section 6 is not subject to any direct contact with ballistic active bodies and/or in that preferably exclusively the hard-ballistic section 2 is subject to direct contact with the ballistic active bodies.

More particularly, the adsorption section 6 together with the hard-ballistic section 2 and optionally a covering section 5 and optionally a soft-ballistic section 4 form a composite material.

In this case, it may be the case in accordance with the invention that the protective material 1 has multiple adsorption sections 6, preferably for formation of a multilayer composite material.

With regard to the bonding of the adsorption section 6 to the rest of the protective material 1, especially to the section(s) 2, 4, 5 adjoining the adsorption section 6, it is preferable in accordance with the invention when the adsorption section 6 is permanently bonded to the adjoining sections 2, 4, 5, preferably by bonding, stapling, stitching or the like.

In addition, it is preferable in the context of the present invention when the proportion by weight of the shaped bodies 3, based on the total weight of the protective material 1, is in the range from 15% by weight to 98% by weight, preferably 25% by weight to 95% by weight, more preferably 30% by weight to 90% by weight.

With regard to the protective material 1 in general, it should be in at least partly deformable and/or flexible and/or extensible form, especially at least partially elastically and/or reversibly deformable and/or flexible and/or extensible. This permits flexible and/or individual adaptation to the geometry with regard to an assigned region or a region to be protected, especially body region.

With regard to the ballistic protection achievable by the protective material 1 and/or the hard-ballistic section 2, it is envisaged in accordance with the invention that the protective material 1 and/or the hard-ballistic section 2 is penetration-resistant at least up to test level 9 according to VPAM-APR 2006 and/or will fulfill at least a ballistic protective function of test level 9 according to VPAM-APR 2006.

Test level 9 according to VPAM-APR 2006 which is specified in accordance with the invention relates more particularly to a determination using 308 Winchester caliber projectiles with a full steel jacket (FMJ), a spire point (PB) and a hard steel core (HC) from the manufacturer FN Herstal, Belgium, and Metallwerk Elisenhütte Nassau, Germany, of the P80 type with a projectile mass of (9.70±0.2) g, a target velocity of (820±10) m/s, a twist length of (254±5)%/mm and a barrel length of (650±3) mm. The test set up according to VPAM-APR 2006 is especially conducted a temperature of (20±3)° C. and especially at a relative air humidity of (65±4)%. A long gun is the type of gun used.

Preferably, the protective material 1 and/or the hard-ballistic section 2 has a limit $V_{50}$, determined according to VPAM-KNB, of at least 500 m/s, especially at least 600 m/s, preferably at least 700 m/s, more preferably at least 800 m/s, especially preferably at least 850 m/s, even more preferably at least 900 m/s, and/or a ballistic limit $V_{50}$, determined according to VPAM-KNB, in the range from 500 m/s to 1000 m/s, especially 600 m/s to 980 m/s, preferably 700 m/s to 960 m/s, more preferably 800 m/s to 940 m/s.

The ballistic limits $V_{50}$ specified in accordance with the invention, determined according to VPAM-KNB, relate more particularly to a determination using projectiles in the form of FMJ (full steel jacket) with a projectile weight of (9.7±0.2) g. The ballistic limits $V_{50}$ according to VPAM-APR 2006 are especially determined a temperature of (20±2)° C. and especially at a relative air humidity of (65±4)%.

The ballistic limit $V_{50}$ relates more particularly to the velocity (m/s) of a ballistic active body at which, using a defined projectile and selected test material, there is a probability of perforation caused by the projectile or penetration of the material of 0.5 (with 1=maximum probability) or of 50%. For further embodiments, reference may be made to the corresponding standard from VPAM-KNB.

FIG. 2 shows a protection element 7 of the invention, preferably ballistic protection element, especially with a protective function against ballistic active bodies (projectile bodies), especially against reinforcement-penetrating and/or armor-piercing projectiles, shear bodies or penetration bodies, preferably in the form of a ballistic protection plate, especially a ballistic armor component, more preferably a ballistic and/or ballistic-resistant composite armor plate.

This ballistic protection element 7 has or is at least essentially formed from a multitude of ballistic and/or ballistic-resistant shaped bodies 3 that are preferably at least essentially spherical, preferably shaped armor bodies, especially for absorbing and/or deflecting and/or distributing kinetic energy from ballistic active bodies (projectile bodies), especially reinforcement-penetrating and/or armor-piercing projectiles, shear bodies or penetration bodies.

More particularly, the protection element 7 in the usable state (use state) and/or wearable state is assigned to a region, preferably body region, and/or covers a region, especially body region, in the usable state (use state) and/or wearable state, as shown in schematic form in FIG. 2.

For further details and remarks regarding the protection element 7 of the invention, reference may be made to the remarks above in connection with the protective material 1 of the invention, especially the hard-ballistic section 2 and/or the shaped bodies 3, which are correspondingly applicable in relation to the protection element 7 of the invention.

In addition, reference may be made to the corresponding dependent claims relating to the protection element 7.

In addition, FIG. 2 shows the protective apparel item 8 of the invention, preferably ballistic protective outer apparel item, especially in the form of a ballistic and/or ballistic-resistant protective vest or jacket, preferably with a protective function against ballistic active bodies (projectile bodies), especially against reinforcement-penetrating and/or armor-piercing projectiles, shear bodies or penetration bodies. This protective apparel item 8 has been manufactured using at least one protective material 1 and/or at least one protection element 7, or comprises at least one protective material 1 and/or at least one protection element 7.

For further details and remarks regarding the protection element 7 and/or protective material 1 of the invention, reference may be made to the remarks above in connection with the protective material 1 and/or protection element 7 of the invention, especially the hard-ballistic section 2 and/or the shaped bodies 3, which are correspondingly applicable in relation to the protection element 7 and/or protective material 1 of the invention.

In addition, reference may be made to the corresponding dependent claims relating to the protection element 7 and/or protective material 1.

In a preferred embodiment, it may additionally be the case that multiple protection elements 7 are independently bonded to the protective apparel item 8 in a detachable or removable or dissociable manner. In this connection, the protection elements 7 may independently be mountable on or introduceable into accommodating devices 9, especially accommodating pockets, of the protective apparel item 8. In this connection, the securing of the protection elements 7 on the protective apparel item 8 can be effected, for example, by accommodation or integration into the accommodating device 9 or by additional securing means, such as hook-and-loop closures, zip fasteners or the like. With regard to the accommodating devices 9, especially accommodating pockets, these may be formed from a two-dimensional textile material, especially in mesh form, it being possible in this regard to use the mesh products or mesh materials known per se to those skilled in the art.

FIG. 3 illustrates a protective apparel unit 10 in the context of the present invention.

Preferably, the protective apparel unit 10 takes the form of a ballistic protective apparel unit, preferably with a protective function against ballistic active bodies (projectile bodies), especially against reinforcement-penetrating and/or armor-piercing projectiles, shear bodies or penetration bodies, comprising outer apparel and/or inner apparel and optionally comprising separate head and/or face protection, neck protection, shoulder protection, arm protection, hand protection, trunk protection, torso protection, genital and/or anal protection and/or leg protection.

More particularly, the protective apparel unit 10 comprises different protective materials 1 and/or protection elements 7 assigned to different body regions in the wearable state and/or covering different body regions in the wearable state.

For further details and remarks regarding the protection element 7 and/or protective material 1 of the invention, reference may be made to the remarks above in connection with the protective material 1 and/or protection element 7 of the invention, especially the hard-ballistic section 2 and/or the shaped bodies 3, which are correspondingly applicable in relation to the protection element 7 and/or protective material 1 of the invention.

In addition, reference may be made in each case to the corresponding dependent claims relating to the protection element 7 and/or protective material 1.

On the basis of the conception of the invention, it is possible to use the protective apparel unit 10 of the invention to functionally supplement or modify the protective apparel item 8 of the invention as shown in FIG. 2, especially ballistic protective vest, in a controlled manner with regard to the ballistic protective function.

The present invention thus specifically also relates to a protective apparel unit 10 comprising the protective apparel item 8 of the invention, and additionally supplemented or combined with further protective materials (for example in the form of neck protection, shoulder protection, arm protection, trunk protection and leg protection according to FIG. 3), each of which has been equipped with a corresponding protective material 1 and/or protection element 7 or which may be combined with additional ballistic protective functions to form the protective apparel unit 10 of the invention.

According to the invention, it is preferable in this connection when the protective apparel unit 10 includes at least one two-dimensional textile material 11. In this connection, it may be the case in accordance with the invention that the two-dimensional textile material 11 together with the protection elements 7 and/or protective materials 1 forms an especially single-ply or single-layer (main area) of the protective apparel unit 10. It may likewise be the case that the two-dimensional textile material 11 is bonded, especially stitched, to the protection elements 7 and/or protective materials 1, especially at the edge in each case, preferably with an edge overlap. In a corresponding manner, individual elements of the two-dimensional material 11 may also be bonded to one another.

The two-dimensional material 11 may thus preferably be arranged in a common plane together with the respective protection elements 7, or forms a continuous area with the corresponding protection elements 7. In this connection, the protection elements 7, independently of one another, and the two-dimensional material 11 are bonded to one another especially in sections, for example by means of stitching, especially based on flat seams.

In this connection, the two-dimensional material 11 may especially be arranged in the protective apparel unit 10 according to the invention in such a way that physiologically less relevant sections or regions of the body, or those that have a lower risk of injury, are covered by the two-dimensional material 11 in the wearable state. For example, in the wearable state, the body regions or sections covered by the further two-dimensional material 11 may be those for which there is already (corresponding) protection by external protection devices, such as the protective apparel item 8 shown in FIG. 2, especially ballistic protective vest, such that, in accordance with the invention, supplementary protection can be achieved in relation to already existing protection systems by specific arrangement of protection elements 7 on the one hand and the at least further two-dimensional textile material 11 on the other hand.

The use of the two-dimensional textile material 11 can firstly achieve wearer comfort, especially caused by high air permeability of the underlying material, and/or a further improvement in the fit of the protective apparel unit 10 of the invention, especially caused by the formation of elastic properties in relation to the further two-dimensional textile material 11. For example, the two-dimensional textile material 11 within the protective apparel unit 10, in the case of an under- or overshirt, may also be arranged in the region of the reverse side of the arms, or, in the case of a pair of undertrousers, in the region of the outside of the upper or lower leg and in the region of the outside of the knee. Especially in the case that the two-dimensional textile material 11 is in elastic or reversibly extensible form, it is possible thereby to achieve fitting to the body, especially close alignment of the protective apparel unit 10 in the wearable state.

Moreover, the two-dimensional textile material 11 should be elastically or reversibly extensible. According to the invention, it may be the case for this purpose that the two-dimensional textile material 11 has at least one elastic and/or reversibly extensible yarn or a corresponding fiber and/or at least one elastic and/or reversibly extensible thread or filament, especially based on a synthetic polymer material.

The present invention further relates—in a further aspect of the invention—also to the use of a protective material 1 or protection element 7, each as described above, for production of all kinds of protective apparel, preferably with a protective function against ballistic active bodies (projectile bodies), especially against reinforcement-penetrating and/or armor-piercing projectiles, shear bodies or penetration bodies, especially in a form fulfilling ballistics resistance at least according to test level 9 of the General Basis for Ballistic Material, Construction and Product Tests issued by the Association of Test Laboratories for Bullet Resistant Materials and Constructions (VPAM-APR 2006). For further details relating to this aspect of the invention, for avoidance of unnecessary repetition, reference may be made to the above remarks relating to the other aspects of the invention, which are correspondingly applicable to this aspect of the invention.

The present invention additionally relates—in yet a further aspect of the invention—also to the use of at least one protective material 1 or protection element 7, each as described above, for endowing apparel with a protective function against ballistic active bodies (projectile bodies), especially against reinforcement-penetrating and/or armor-piercing projectiles, shear bodies or penetration bodies, especially wherein the at least one protective material 1 and/or protection element 7 in the usable state (use state) and/or wearable state is assigned to a region to be protected, especially body region, preferably extends over a region, preferably body region, and/or at least partly covers a region, especially body region. For further details relating to this aspect of the invention, for avoidance of unnecessary repetition, reference may be made to the above remarks relating to the other aspects of the invention, which are correspondingly applicable to this aspect of the invention.

The present invention additionally relates—in yet a further aspect of the invention—to the use of at least one protective material 1 and/or at least one protection element 7 (preferably a ballistic protection element in plate form, especially ballistic armor component, more preferably a ballistic and/or ballistic-resistant composite armor plate), each as described above, for manufacture of all kinds of vehicles, especially cars, trucks, utility vehicles, land vehicles or the like, preferably with a protective function against ballistic active bodies (projectile bodies), especially against reinforcement-penetrating and/or armor-piercing projectiles, shear bodies or penetration bodies. For further details relating to this aspect of the invention, for avoidance of unnecessary repetition, reference may be made to the above remarks relating to the other aspects of the invention, which are correspondingly applicable to this aspect of the invention.

The present invention further relates—in yet a further aspect of the invention—also to the use of at least one protective material 1 and/or at least one protection element 7 (preferably a ballistic protection element in plate form, especially ballistic armor component, more preferably a ballistic and/or ballistic-resistant composite armor plate), each as described above, for endowing all kinds of vehicles, especially cars, trucks, utility vehicles, land vehicles or the like, with a protective function against ballistic active bodies (projectile bodies), especially against reinforcement-penetrating and/or armor-piercing projectiles, shear bodies or penetration bodies. For further details relating to this aspect of the invention, for avoidance of unnecessary repetition, reference may be made to the above remarks relating to the other aspects of the invention, which are correspondingly applicable to this aspect of the invention.

The present invention additionally relates—in yet a further aspect of the invention—also to the use of at least one protective material 1 and/or at least one protection element 7 (preferably a ballistic protection element in plate form, especially ballistic armor component, more preferably a ballistic and/or ballistic-resistant composite armor plate), each as described above, for manufacture of all kinds of objects or buildings, preferably with a protective function against ballistic active bodies (projectile bodies), especially against reinforcement-penetrating and/or armor-piercing projectiles, shear bodies or penetration bodies. For further details relating to this aspect of the invention, for avoidance of unnecessary repetition, reference may be made to the above remarks relating to the other aspects of the invention, which are correspondingly applicable to this aspect of the invention.

The present invention further relates—in yet a further aspect of the invention—likewise to the use of at least one protective material 1 and/or at least one protection element 7 (preferably a ballistic protection element in plate form, especially ballistic armor component, more preferably a ballistic and/or ballistic-resistant composite armor plate), each as described above, for endowing all kinds of objects or buildings with a protective function against ballistic active bodies (projectile bodies), especially against reinforcement-penetrating and/or armor-piercing projectiles, shear bodies or penetration bodies. For further details relating to this aspect of the invention, for avoidance of unnecessary repetition, reference may be made to the above remarks relating to the other aspects of the invention, which are correspondingly applicable to this aspect of the invention.

The present invention additionally relates—in yet a further aspect of the invention—also to all kinds of vehicles, especially cars, trucks, utility vehicles, land vehicles or the like, preferably with a protective function against ballistic active bodies (projectile bodies), especially against reinforcement-penetrating and/or armor-piercing projectiles, shear bodies or penetration bodies, wherein the vehicles have been manufactured using at least one protective material 1 as described above and/or at least one protection element 7 as described above (preferably a ballistic protection element in plate form, especially ballistic armor component, more preferably a ballistic and/or ballistic-resistant composite armor plate), or wherein the vehicles include at least one protective material 1 as described above and/or at least one protection element 7 as described above (preferably a ballistic protection element in plate form, especially ballistic armor component, more preferably a ballistic and/or ballistic-resistant composite armor plate). For further details relating to this aspect of the invention, for avoidance of unnecessary repetition, reference may be made to the above remarks relating to the other aspects of the invention, which are correspondingly applicable to this aspect of the invention.

The present invention further relates—in yet a further aspect of the invention—to all kinds of objects or buildings, preferably with a protective function against ballistic active bodies (projectile bodies), especially against reinforcement-penetrating and/or armor-piercing projectiles, shear bodies or penetration bodies, wherein the objects or buildings have been manufactured using at least one protective material 1 as described above and/or at least one protection element 7 as described above (preferably a ballistic protection element in plate form, especially ballistic armor component, more preferably a ballistic and/or ballistic-resistant composite armor plate), or wherein the objects or buildings include at least one protective material 1 as described above and/or at least one protection element 7 as described above (preferably a ballistic protection element in plate form, especially ballistic armor component, more preferably a ballistic and/or ballistic-resistant composite armor plate). For further details relating to this aspect of the invention, for avoidance of unnecessary repetition, reference may be made to the above remarks relating to the other aspects of the invention, which are correspondingly applicable to this aspect of the invention.

The present invention finally relates—in yet a further aspect of the invention—also to a method of providing protection, preferably of personnel, against ballistic active bodies (projectile bodies), especially against reinforcement-penetrating and/or armor-piercing projectiles, shear bodies or penetration bodies, wherein a protective material 1 or protection element 7, each as described above, is subjected to contact with the ballistic active bodies (projectile bodies), especially hitting and/or striking and/or penetration, such that the kinetic energy of the ballistic active bodies (projectile bodies) is absorbed and/or deflected and/or distributed by means of the multitude of ballistic and/or ballistic-resistant shaped bodies 3.

For further details relating to this aspect of the invention (i.e. the method of the invention), for avoidance of unnecessary repetition, reference may be made to the above remarks relating to the other aspects of the invention, which are correspondingly applicable to this aspect of the invention.

Further configurations, alterations, variations, modifications, special features and advantages of the present invention will be immediately apparent and achievable for the person skilled in the art on reading the description, without leaving the scope of the present invention.

The present invention is illustrated by the working examples which follow, but these are not intended to restrict the present invention in any way.

Working Examples

1. Production of the Protective Material of the Invention
(i) For production of a protective material in plate form having a length of 310 mm, a width of 290 mm and a height of 17.6 mm, a hard-ballistic protective function is provided by first arranging two layers of spheres consisting of respectively spherical and ballistic-resistant shaped bodies each having a diameter of 10 mm in a plane with maximum density and with minimization of the empty volumes formed or enclosed between the shaped bodies, and cohesively bonding them to one another. Subsequently, the coherent flat layers of spheres are stacked with maximum density one on top of another and with minimization of the empty volumes formed between the layers of shaped bodies, and likewise cohesively bonded to one another. The cohesive bonding of the spherical shaped bodies to one another is implemented by a reactive epoxy resin. The spherical shaped bodies have been manufactured at least essentially from a ceramic material based on aluminum oxide.

(ii) Furthermore, in addition to the hard-ballistic protective function, the provision of a soft-ballistic (splinter) protection function is envisaged, which consists of textile fiber filaments, especially based on ultrahigh-molecular weight polyolefins, and these are processed to give a loop-drawn knit or loop-formed knit. Preferably, the hard-ballistic section 2 has been inserted into the soft-ballistic section 5, such that the soft-ballistic section 5 in the usable state forms a sheath around the hard-ballistic section 2.

(iii) The result is thus a protective material 1 of the invention with a hard-ballistic protective function based on the densest possible relative arrangement of spherical shaped bodies and an additional soft-ballistic (splinter) protective function based on a two-dimensional textile material.

2. Production of the Protection Element of the Invention

For details and remarks relating to the manufacture of the protection element in the form of a two-layer composite armor plate, reference may be made to the remarks in point 1. (i) in connection with the manufacture of the protective material of the invention. Consequently, the protection element differs from the protective material merely in that no additional soft-ballistic protective function is provided in the protection element, by contrast with the protective material.

3. Testing of the Ballistics Resistance of the Protective Material (i) Definition and Test Conditions:

The ballistics resistance of the protective material and of the protection element is tested by conducting a ballistic test according to test level 9 as per the General Basis for Ballistic Material, Construction and Product Tests, published by the Association of Test Laboratories for Bullet Resistant Materials and Constructions (VPAM-APR 2006).

The term "penetration resistance" is understood to mean the resistance that a material or a construction offers to the penetration of a projectile under defined conditions.

In this context, a material or a construction is penetration-resistant when it offers a defined resistance against attacks by particular types of guns and munitions.

The term "test level" refers to a classification of a resistance against a particular attack potential.

If the material fulfills the criterion of penetration resistance according to test level 9, it is suitable in principle for modification or manufacture of protective vests of the SK4 protection class and thus offers protection from long gun munitions with a full jacket and hard core.

The procedure for the ballistic testing is according to the test guideline "Bullet Resistant Plate Materials" issued by the Association of Test Laboratories for Bullet Resistant Materials and Constructions (VPAM-PM 2007).

For testing with standardized munition types according to test level 9, a long gun of 308 Winchester caliber with a twist length of (254 mm±5)% and a barrel length of 650 mm is used.

The munition type used is a full steel jacket with spire point and hard steel core with a weight of (9.7±0.2) g of the P80 type from the manufacturer FN Herstal, Belgium or Metallwerk Elisenhütte Nassau, Germany.

The shooting distance is (10±0.5) m at a shooting velocity of at least 820±10 m/s.

The ballistic test was conducted at a room temperature of 21° C. and a relative air humidity of 59%.

A material to be tested meets the ballistic requirements according to test level 9 when the material is penetration-resistant under the above-defined test conditions.

(ii) Test Results:

The results of the ballistic testing based on the test conditions specified above under point 3. (i) for the protective material of the invention and the protection element of the invention are summarized below:

| No. | Velocity V(7.50) [m/s] | Energy E(7.50) [J] | Penetration | Angle [degrees] | Comment |
| --- | --- | --- | --- | --- | --- |
| 1 | 835 | 3382 | no | 90.0 | Stopped in hard protective material |
| 2 | 826 | 3309 | no | 90.0 | Stopped in hard protective material |
| 3 | 821 | 3269 | no | 90.0 | Stopped in hard protective material |

The results show that the protective material of the invention, in all three test runs, is penetration-resistant against a shooting velocity of 820 m/s and hence meets the demands of test level 9 in relation to VPAM-APR 2006.

The provision of a hard-ballistic protection function by the multitude of separate shaped bodies at least essentially in spherical form can thus achieve a significant reduction in weight coupled with penetration resistance at least according to test level 9 (VPAM-APR 2006).

Overall, the above remarks thus show that the protective material of the invention has distinctly improved properties compared to the prior art with regard to wearer comfort, especially as a result of a significant reduction in wearing weight.

For details and remarks in relation to the protection element of the invention, reference may be made to the above remarks in connection with the protective material of the invention.

The invention claimed is:

1. A ballistic protective outer apparel item comprising at least one ballistic protective material for protection from ballistic active bodies, wherein the protective material comprises a ballistic contact area,
    wherein the protective material comprises at least one hard-ballistic section assigned to the ballistic contact area or forming the ballistic contact area, for protection from the ballistic active bodies,
    wherein the hard-ballistic section has a fragment or ballistic protection value $V_{50}$, determined according to STANAG 2920, of at least 180 m/s,
    wherein the hard-ballistic section comprises a multitude of ballistic-resistant shaped bodies that are essentially spherical for at least one of absorbing, deflecting and distributing kinetic energy from the ballistic active bodies,
    wherein the proportion by volume of the shaped bodies, based on the total volume of the hard-ballistic section, is in the range from 20% by volume to 99% by volume, wherein the shaped bodies have a Vickers hardness of at least 1200 HV, determined according to DIN EN ISO 6507, wherein the shaped bodies, for formation of a coherent microstructure in the form of a multilayer composite are permanently bonded to one another by means of at least one of sintering, soldering, welding and binding, wherein in the case of binding the binding is performed by means of at least one binder, wherein the binder is selected from the group consisting of (i) inorganic binders; (ii) organic binders; (iii) polymer materials; (iv) adhesives; and (v) mixtures or combinations of the aforementioned materials and wherein the binder in a cured state is at least partially deformable, wherein the shaped bodies are positioned in a homogeneous three-dimensional arrangement to each other, wherein the protective material, in addition to the hard-ballistic section, has at least one soft-ballistic section, wherein the soft-ballistic section is bonded to the hard-ballistic section, wherein the soft-ballistic section takes the form of a textile sheetlike material, wherein the soft-ballistic section comprises or consists of fibers of at least one polyolefin of ultrahigh molecular weight, and wherein the protective material comprises multiple hard-ballistic sections and soft-ballistic sections in an alternating arrangement, one on top of another, for formation of a multilayer composite material.

2. The protective outer apparel item as claimed in claim 1, wherein the ballistic protective outer apparel item is a ballistic-resistant protective vest or jacket.

3. The protective outer apparel item as claimed in claim 1, wherein the hard-ballistic section is in layered form, with two opposite sides, wherein the ballistic contact area is formed by one side of the two opposite sides of the hard-ballistic section.

4. The protective outer apparel item as claimed in claim 1, wherein the shaped bodies within the hard-ballistic section are arranged adjoining one another or touching one another.

5. The protective outer apparel item as claimed in claim 1, wherein the shaped bodies are arranged within the hard-ballistic section such that a volume differential between the total volume of the hard-ballistic section and a sum total of component volumes occupied by each individual shaped body is minimized and is less than 50% by volume of the total volume of the hard-ballistic section.

6. The protective outer apparel item as claimed in claim 1, wherein the proportion by volume of the shaped bodies, based on the total volume of the hard-ballistic section, is in the range from 30% by volume to 95% by volume.

7. The protective outer apparel item as claimed in claim 1, wherein the proportion by weight of the shaped bodies, based on the total weight of the hard-ballistic section, is in the range from 30% by weight to 98% by weight.

8. The protective outer apparel item as claimed in claim 1, wherein the shaped bodies have essentially the same diameter.

9. The protective outer apparel item as claimed in claim 1, wherein the shaped bodies each have a diameter in the range from 0.1 mm to 10 cm.

* * * * *